United States Patent
Grambichler et al.

(10) Patent No.: US 10,323,962 B2
(45) Date of Patent: Jun. 18, 2019

(54) USING A VARIABLE SWITCHING THRESHOLD FOR PROVIDING AN OUTPUT

(71) Applicant: Infineon Technologies AG, Neubiberg (DE)

(72) Inventors: Klaus Grambichler, Velden (AT); Tobias Werth, Villach (AT); Simon Hainz, Villach (AT)

(73) Assignee: Infineon Technologies AG, Neubiberg (DE)

(*) Notice: Subject to any disclaimer, the term of this patent is extended or adjusted under 35 U.S.C. 154(b) by 406 days.

(21) Appl. No.: 15/052,239

(22) Filed: Feb. 24, 2016

(65) Prior Publication Data
US 2017/0241812 A1   Aug. 24, 2017

(51) Int. Cl.
G01D 5/247    (2006.01)
G01D 3/032    (2006.01)

(52) U.S. Cl.
CPC .............. G01D 5/247 (2013.01); G01D 3/032 (2013.01)

(58) Field of Classification Search
CPC .... G01D 5/145; G01D 5/2013; G01D 5/2448; G01D 3/02; G01D 3/022
See application file for complete search history.

(56) References Cited

U.S. PATENT DOCUMENTS

| | | | | |
|---|---|---|---|---|
| 5,451,867 A | * | 9/1995 | Loreck | B60T 8/172 324/163 |
| 2003/0210035 A1 | * | 11/2003 | Manlove | G01D 3/02 324/166 |
| 2006/0103377 A1 | | 5/2006 | Hara et al. | |
| 2011/0270553 A1 | * | 11/2011 | Ausserlechner | G01R 15/202 702/64 |
| 2011/0298450 A1 | * | 12/2011 | Foletto | G01D 5/145 324/207.14 |
| 2013/0328554 A1 | * | 12/2013 | Pigott | G01D 5/2013 324/207.25 |
| 2014/0019084 A1 | * | 1/2014 | Rolew | G01D 5/145 702/150 |
| 2014/0214352 A1 | * | 7/2014 | Tart | G01P 3/481 702/88 |
| 2015/0061656 A1 | * | 3/2015 | Fernandez | G01B 7/003 324/207.25 |

FOREIGN PATENT DOCUMENTS

| | | |
|---|---|---|
| JP | 2006-145528 | 6/2006 |
| JP | 2006-242637 | 9/2006 |
| JP | 2014-502723 | 2/2014 |

* cited by examiner

*Primary Examiner* — Son T Le
*Assistant Examiner* — Adam S Clarke
(74) *Attorney, Agent, or Firm* — Harrity & Harrity, LLP

(57) ABSTRACT

A magnetic circuit may include a magnetic sensor. The magnetic sensor may determine an adjustment factor associated with calculating a variable switching threshold. The variable switching threshold may be a configurable switching threshold based on which the magnetic sensor provides outputs associated with a speed signal corresponding to a rotation of a tooth wheel. The magnetic sensor may provide an output, associated with the speed signal, based on the variable switching threshold.

20 Claims, 9 Drawing Sheets

USING A VARIABLE SWITCHING THRESHOLD FOR PROVIDING AN OUTPUT

BACKGROUND

A magnetic sensor may sense a magnetic field produced by a rotating magnet wheel, such as a ferromagnetic tooth wheel. The magnetic sensor may output, based on the sensed magnetic field, a signal for use in identifying a position of the magnet wheel or a rotational speed of the magnet wheel.

SUMMARY

According to some possible implementations, a magnetic circuit may include a magnetic sensor to: determine an adjustment factor associated with calculating a variable switching threshold, where the variable switching threshold may be a configurable switching threshold based on which the magnetic sensor provides outputs associated with a speed signal corresponding to a rotation of a tooth wheel; and provide an output, associated with the speed signal, based on the variable switching threshold.

According to some possible implementations, a sensor may include: one or more sensing elements; and a processor to: determine an adjustment factor associated with a configurable switching threshold, where the configurable switching threshold may be a threshold associated with providing output signals associated with a signal corresponding to a component detected by the one or more sensing elements; determine a minimum signal value, associated with the signal, and a maximum signal value associated with the signal; calculate the configurable switching threshold based on the minimum signal value, the maximum signal value, and the adjustment factor; and provide an output signal, associated with the signal, based on the configurable switching threshold.

According to some possible implementations, a method may include: identifying, by a magnetic sensor, an adjustment factor associated with determining a variable switching threshold, where the variable switching threshold may be a configurable switching threshold associated with providing outputs based on a speed signal corresponding to a magnetic field sensed by the magnetic sensor; and providing, by the magnetic sensor, a set of outputs, associated with the speed signal, based on the variable switching threshold.

DETAILED DESCRIPTION

Figure 1A:
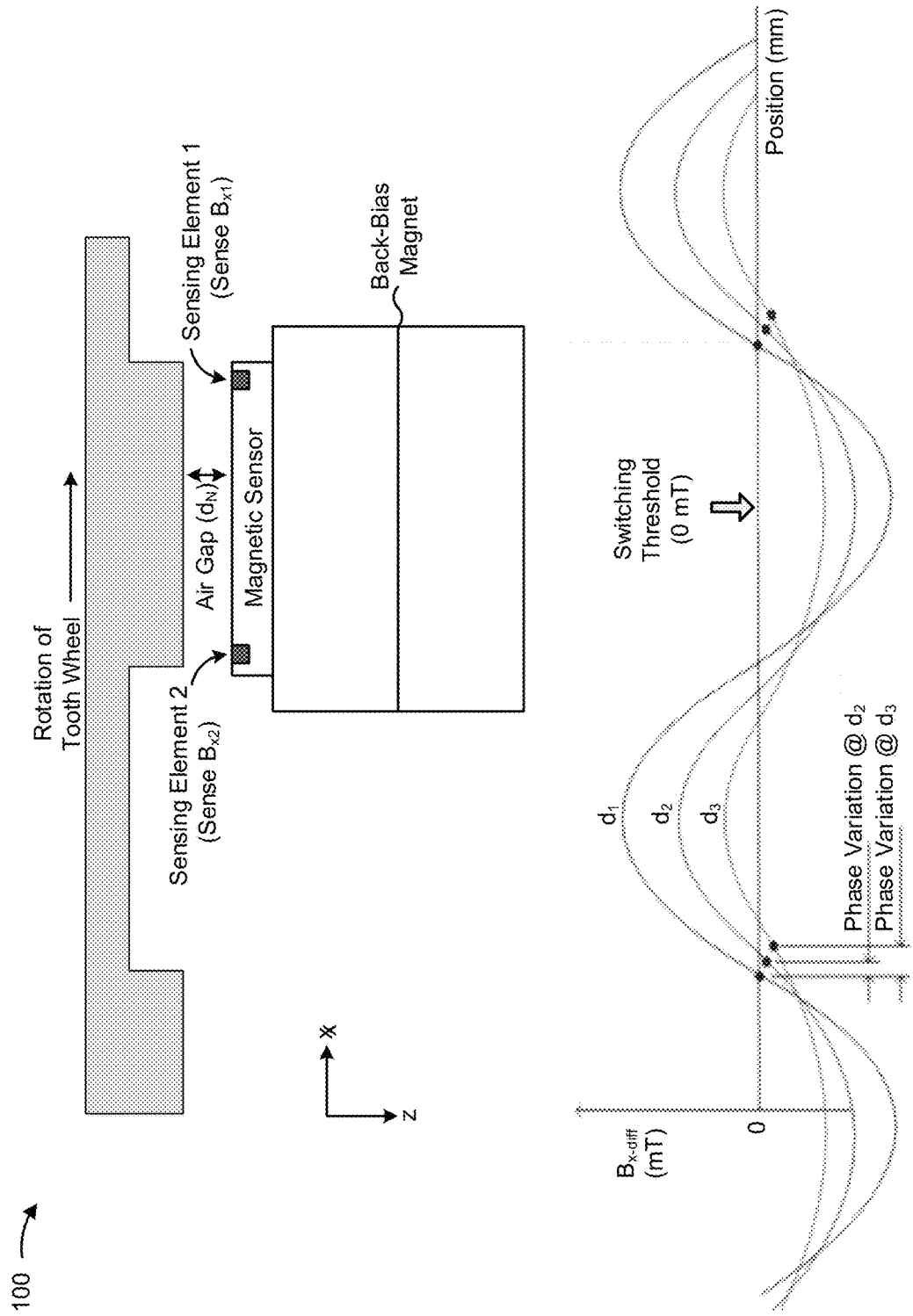
FIGS. 1A and 1B are diagrams of an overview of an example implementation described herein.

The following detailed description of example implementations refers to the accompanying drawings. The same reference numbers in different drawings may identify the same or similar elements.

A magnetic sensor may be used to determine a speed and/or a rotational angle of a rotating object in, for example, an automotive context (e.g., a crankshaft, a camshaft, or an axle). The magnetic sensor may provide outputs based on sensing a magnetic field present at the magnetic sensor. The magnetic field may be produced or distorted by a magnet wheel, such as a tooth wheel made of a ferromagnetic material, that is positioned relative to the magnetic sensor. As a particular example, the magnetic sensor may provide a first output (e.g., a signal with a first voltage level, a signal with a first current level) while a speed signal, corresponding to the strength of the magnetic field present at the magnetic sensor, satisfies a switching threshold (e.g., is greater than a particular magnetic field strength) and may provide a second output (e.g., a signal with a second voltage level, a signal with a second current level) while the speed signal does not satisfy the switching threshold (e.g., when the speed signal is less than or equal to the particular magnetic field strength). Typically, the switching threshold is a static switching threshold configured as one-half of a difference between a maximum value of the speed signal and a minimum value of the speed signal (e.g., a zero crossing of the speed signal). In this example, the magnetic sensor may switch between the first output and the second output when the speed signal crosses the switching threshold.

An electronic control unit (ECU) may receive the outputs provided by the magnetic sensor and, based on the outputs, may determine the speed and/or the rotational angle of the tooth wheel (e.g., for use in controlling one or more systems). As the speed and/or the rotational angle are determined based on the outputs, and the outputs are provided based on the speed signal being compared to the switching threshold, it is important that the magnetic sensor accurately determine the speed signal corresponding to the rotation of the tooth wheel (e.g., such that the speed and/or rotational angle may be accurately determined).

Traditionally, the magnetic sensor is implemented as a sensor, such as a differential Hall sensor, that senses a component of the magnetic field in a direction that is generally perpendicular to a direction of rotation of the tooth wheel (herein referred to as a z-component). In such a case, a set of sensing elements (e.g., a first sensing element and a second sensing element) sense, based on a Hall-effect, the z-component of the magnetic field at a first location (e.g., a first edge of the magnetic sensor) and a second location (e.g., a second edge of the magnetic sensor). Here, the magnetic sensor may determine the speed signal during rotation of the rotating object as a difference between the strength of the magnetic field component sensed by the first sensing element and the strength of the magnetic field component sensed by the second sensing element (e.g., $B_{z\text{-}diff} = B_{z1} - B_{z2}$).

Here, when the magnetic sensor identifies that the speed signal crosses the static switching threshold (e.g., $B_{z\text{-}diff} = 0$ mT), the magnetic sensor may switch from providing a first output (e.g., a signal with a first voltage level, a signal with a first current level) to providing a second output (e.g., a signal with a second voltage level, a signal with a second current level). The ECU may determine the speed and/or the rotational angle of the rotating object based on the outputs provided by the magnetic sensor. Notably, when the magnetic sensor senses the z-component of the magnetic field (as with the differential Hall sensor), variations in an air gap (e.g., a distance between the sensing elements and the tooth wheel) do not affect the speed signal. In other words, variations in the air gap do not affect the position at which the magnetic sensor determines that the speed signal crosses the static switching threshold.

However, it may be advantageous to implement the magnetic sensor as a differential magnetoresistive (MR) sensor, rather than a differential Hall sensor. A differential MR sensor measures magnetoresistance based on, for example, an anisotropic magnetoresistance (AMR) effect, a giant magnetoresistance (GMR) effect, a tunnel magnetoresistance (TMR) effect, or the like. Implementing the magnetic sensor as a differential MR sensor may be advantageous in that MR-based sensing provides improved jitter performance at a lower current consumption as compared to Hall-based sensing.

However, in the case of the differential MR sensor, the magnetic sensor may include a set of sensing elements that sense a component of the magnetic field in a direction that is generally parallel to a direction of rotation of the tooth wheel and substantially orthogonal to the z-component of the magnetic field (herein referred to as an x-component of the magnetic field). Here, the magnetic sensor may determine a speed signal based on a difference between the strength of the magnetic field as sensed by each of the set of sensing elements (e.g., $B_{x1}-B_{x2}=B_{x\text{-}diff}$). As described above, the magnetic sensor may, based on identifying the speed signal crossing the static switching threshold (e.g., $B_{x\text{-}diff}=0$ mT), provide outputs from which the ECU may determine the speed and/or the rotational angle of the rotating object. Notably, while implementations described herein are described in the context of MR-based sensors, in some implementations, another type of sensor capable of sensing a component of a magnetic field may be used, such as a Hall-based sensor, a variable reluctance (VR) sensor that operates based on induction, or the like.

However, variations in the air gap may affect the speed signal as determined by the differential MR sensor (unlike the differential Hall sensor). For example, a phase of a speed signal determined by the differential MR sensor for a first air gap size may be different than a phase of a speed signal determined by the differential MR sensor for a second (i.e., different) air gap size. In other words, due to the phase variations, a static switching threshold crossing of the speed signal associated with the first air gap size may be different than a static switching threshold crossing of the speed signal associated with the second air gap size. This variation of the static switching threshold crossing position causes a change in an output protocol timing and leads to additional problems, such as an inaccuracy of ignition timing (e.g., in an automotive context).

It may be possible to reduce such a phase variation by designing the tooth wheel specifically for a given context (i.e., designing the tooth wheel differently based on the particular context) and/or by designing a back-bias magnet specifically for the given context (e.g., designing the back-bias magnet differently based on the particular context). However, these solutions may increase a cost (e.g., a monetary cost or a material cost), an amount of time, and/or a complexity associated with designing and/or producing a magnetic circuit that includes the magnetic sensor.

Figure 1B:
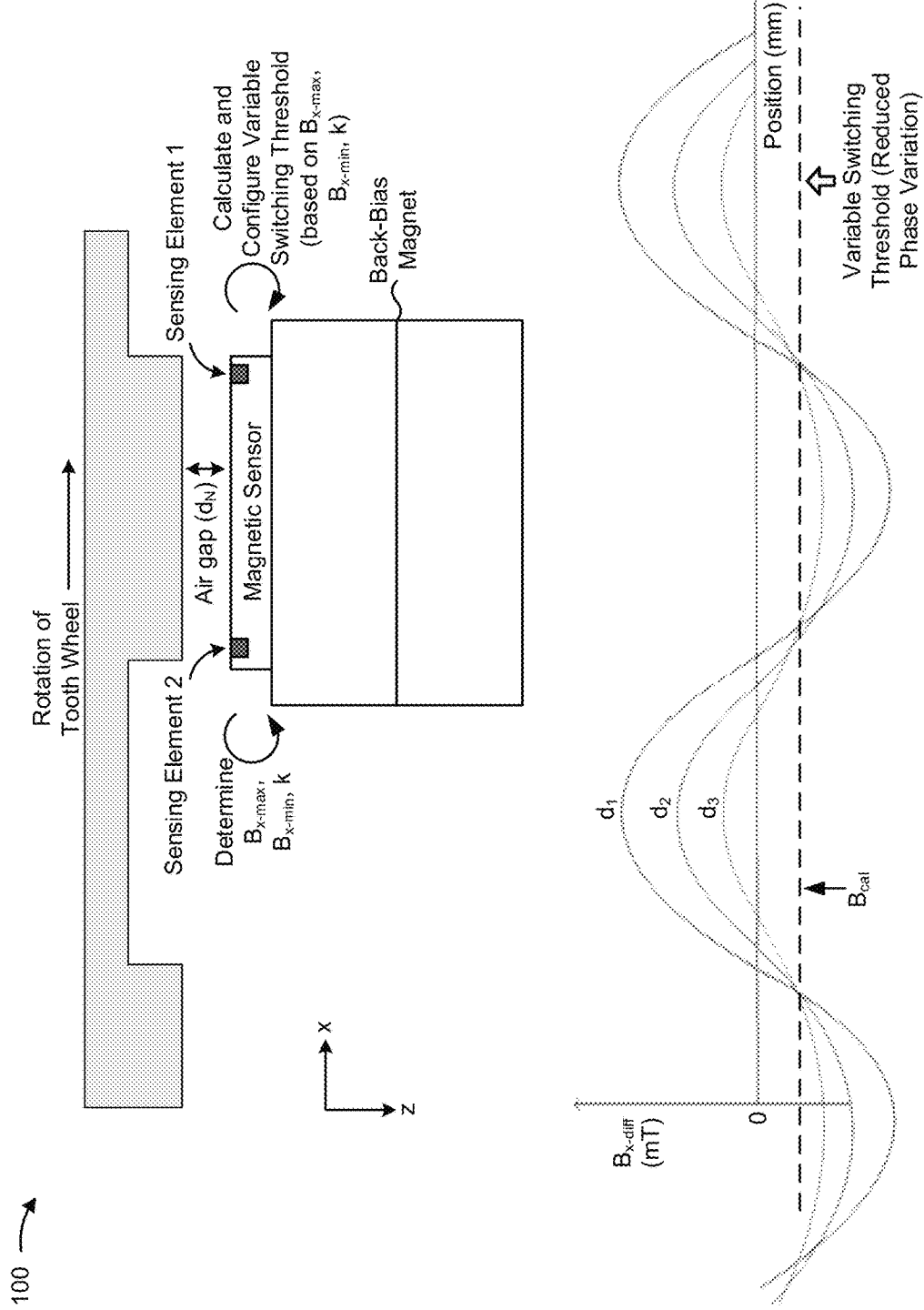

Implementations described herein relate to a magnetic sensor capable of determining and configuring a variable switching threshold for providing outputs associated with a magnetic field present at the magnetic sensor. The use of the variable switching threshold reduces an effect (e.g., phase variations) on a speed signal caused by variations in an air gap associated with the magnetic sensor, leading to improved performance of the magnetic sensor (e.g., as compared to using a static switching threshold). FIGS. 1A and 1B are diagrams of an overview of an example implementation 100 described herein. As shown in the upper portion of FIG. 1A, example implementation 100 may include a magnetic circuit comprising a tooth wheel, a magnetic sensor including a first sensing element (e.g., sensing element 1) and a second sensing element (e.g., sensing element 2), and a back-bias magnet coupled to the magnetic sensor. For the purposes of example implementation 100, assume that the first sensing element is configured to sense a strength of an x-component of a magnetic field present at the first sensing element (e.g., $B_{x1}$) and that the second sensing element is configured to sense a strength of the x-component of the magnetic field present at the second sensing element (e.g., $B_{x2}$). As shown, the magnetic sensor may be positioned such that an air gap of size $d_N$ exists between the set of sensing elements and the tooth wheel. The magnetic sensor may determine, during rotation of the tooth wheel, a speed signal (e.g., $B_{x\text{-}diff}$) based on the strengths of the x-component of the magnetic field sensed by the first sensing element and the second sensing element (e.g., $B_{x\text{-}diff}=B_{x1}-B_{x2}$).

As shown in the lower portion of FIG. 1A, for a first air gap size (e.g., $d_N=d_1$), the speed signal may have a first particular phase, as shown with respect to the line labeled "$d_1$" in the lower portion of FIG. 1A. However, as shown, for a second air gap size $d_2$ (e.g., $d_N=d_2>d_1$), the phase of the speed signal may be different than the phase of the speed signal associated with the air gap of size $d_1$. For example, when the magnetic circuit has an air gap of size $d_2$, static switching threshold crossings (e.g., zero crossings) of the speed signal may be shifted as shown with respect to the line labeled "$d_2$" in the lower portion of FIG. 1A. In other words, the speed signal may include a phase variation for an air gap of size $d_2$ as compared to the speed signal associated with the air gap size of $d_1$.

As further shown in the lower portion of FIG. 1A, for a third air gap size $d_3$ (e.g., $d_N=d_3>d_2$), the phase of the speed signal may experience an increased variation from the phase associated with the air gap of size $d_1$ (e.g., as compared to the phase variation associated with air gap size $d_2$). For example, when the magnetic circuit has an air gap of size $d_3$, static switching threshold crossings of the speed signal may be shifted even further, as shown with respect to the line labeled "$d_3$" in the lower portion of FIG. 1A. In other words, the speed signal may include a phase variation for an air gap of size $d_3$ as compared to both the speed signal associated with the air gap size of $d_1$ and the speed signal associated with the air gap size of $d_2$. As such, the phase of the speed signal may differ for different air gap sizes. These phase variations may cause the issues described above due to the use of the static switching threshold. In order to correct for such phase variations, the magnetic sensor may be capable of determining and configuring a variable switching threshold associated with providing outputs to the ECU, as described below.

For the purposes of FIG. 1B, assume that the magnetic sensor stores or has access to information that identifies an adjustment factor associated with calculating a level to which a variable switching threshold is to be configured. The adjustment factor (sometimes referred to as a k-factor and identified as variable "k") may include a value corresponding to a switching threshold for which phase variations in speed signals, resulting from various air gaps associated with the magnetic sensor, are small (e.g., as compared to other k-factors), minimized (e.g., approximately zero), less than a threshold amount, or the like. For example, the adjustment factor may be a value (e.g., from 0.0 to 1.0), a percentage (e.g., from 0% to 100%), or the like. The variable switching threshold may include a configurable switching threshold (e.g., configurable on the magnetic sensor) at which the magnetic sensor provides outputs based on the speed signal (rather than providing outputs based on a static switching threshold, such as a zero crossing).

As shown in the upper portion of FIG. 1B, the magnetic sensor may determine, during rotation of the tooth wheel, a maximum speed signal strength (e.g., $B_{x\text{-}max}$) and a minimum speed signal strength (e.g., $B_{x\text{-}min}$). As further shown, the magnetic sensor may calculate, based on k, $B_{x\text{-}min}$, and $B_{x\text{-}max}$, the level to which the variable switching threshold is to be configured (e.g., $B_{cal}$), and may configure the magnetic sensor with the variable switching threshold level, accordingly. For example, as shown in the lower portion of FIG. 1B, the magnetic sensor may calculate the variable switching threshold level as a magnetic field strength that is less than zero (e.g., $B_{cal}$<0 mT). Here, the magnetic sensor may configure the variable switching threshold as a value equal to the calculated level. Based on this configuration, the magnetic sensor may provide outputs based on the variable switching threshold (e.g., when $B_{x\text{-}diff}=B_{cal}$) rather than a zero crossing of the speed signal (e.g., when $B_{x\text{-}diff}=0$). Due to the switching of the outputs based on the variable switching threshold, rather than the static switching threshold, an effect of different air gap sizes on a phase of speed signals may be reduced for a variety of air gaps.

In this way, a magnetic sensor may determine and configure a variable switching threshold that reduces an effect (e.g., phase variations) on a speed signal caused by variations in an air gap associated with the magnetic sensor. This may improve performance of the magnetic sensor (e.g., as compared to using a static switching threshold).

As indicated above, FIGS. 1A and 1B are provided merely as an example. Other examples are possible and may differ from what was described with regard to FIGS. 1A and 1B.

Notably, while FIGS. 1A and 1B are described in the context of $B_x$ and $B_z$ components of the magnetic field, in some implementations, to other directions of the magnetic field (i.e., the techniques described herein are not limited to the $B_x$ and $B_z$ components of the magnetic field).

Figure 2:
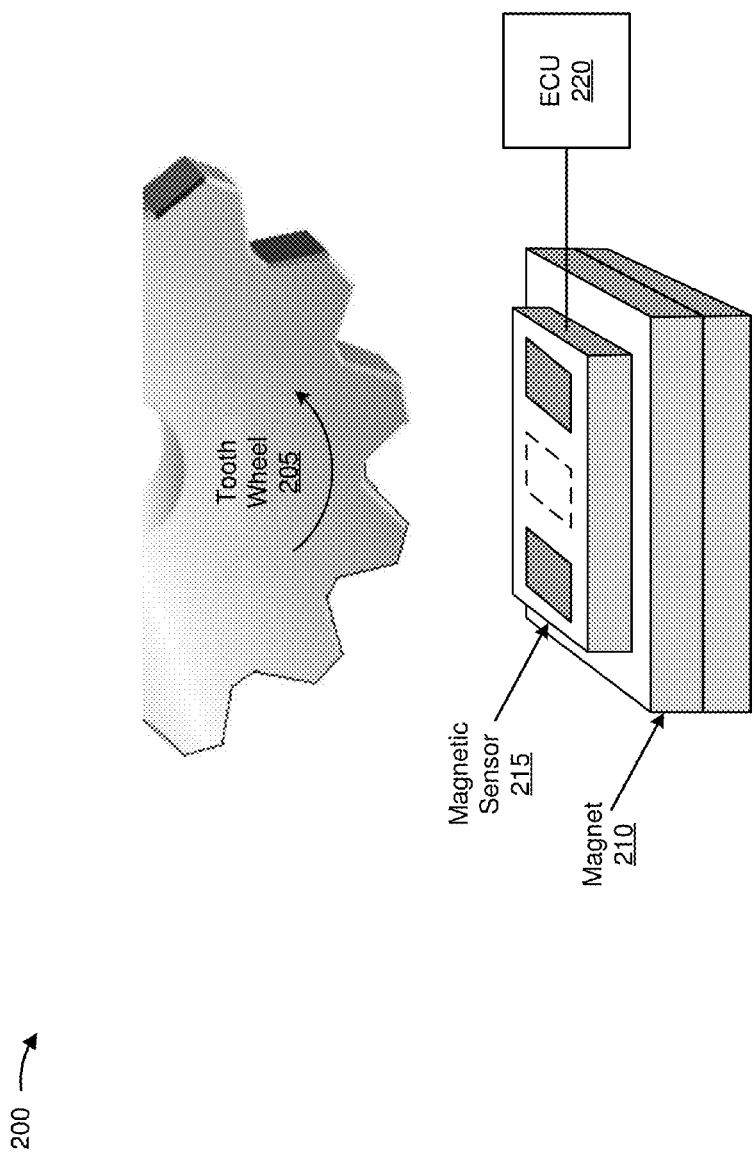
FIG. 2 is a diagram of an example environment in which apparatuses described herein may be implemented.

FIG. 2 is a diagram of example environment 200 in which apparatuses described herein may be implemented. As shown in FIG. 2, environment 200 may include a tooth wheel 205, a magnet 210, a magnetic sensor 215, and an ECU 220.

Tooth wheel 205 may include a wheel comprising a set of teeth. In some implementations, tooth wheel 205 may, during a rotation, distort a magnetic field of a magnet 210 such that magnetic sensor 215 may sense the distorted magnetic field associated with magnet 210. In some implementations, tooth wheel 205 may be comprised of a ferromagnetic material, and may produce a magnetic field. In some implementations, tooth wheel 205 may be attached to or coupled with an object for which a speed, a rotational direction, and/or a position is to be measured, such as a cylindrical structure (e.g., a crankshaft, a camshaft, or a rotating cylinder), a wheel structure (e.g., associated with a tire), an axle (e.g., a vehicle axle), or the like.

In some implementations, tooth wheel 205 may include a first section that includes a set of teeth around a first portion of a circumference of tooth wheel 205, and a second section that has no teeth around a second portion of the circumference of tooth wheel 205. Within the first section, each of the set of teeth may be separated by a particular width (herein referred to as a tooth gap), and the second section may have a width that is greater than one tooth gap (herein referred to as a reference zone). In some implementations, such as in a crankshaft context, tooth wheel 205 may include a symmetrical tooth wheel, where teeth of tooth wheel 205 have a same width and tooth gaps of tooth wheel 205 have a same width (other than within the reference zone). In some implementations, such as in a camshaft context, tooth wheel 205 may include an asymmetrical tooth wheel, where teeth of tooth wheel 205 have varying widths and/or tooth gaps of tooth wheel 205 have varying widths (e.g., with no reference zone).

Magnet 210 may include a magnet that produces a magnetic field that may be sensed by magnetic sensor 215. In some implementations, magnet 210 may be positioned such that the magnetic field, produced by magnet 210, is distorted by tooth wheel 205. Additionally, or alternatively, magnet 210 may include a back-bias magnet and/or may be positioned near, included in, and/or attached to magnetic sensor 215.

Magnetic sensor 215 may include a housing associated with one or more components of a sensor, such as a magnetoresistive (MR) sensor. In some implementations, magnetic sensor 215 may be connected to ECU 220 such that magnetic sensor 215 may provide outputs, associated with tooth wheel 205, to ECU 220 via one or more transmission interfaces (e.g., a voltage interface or a current interface) and/or via one or more output terminals. In some implementations, magnetic sensor 215 may include a three-wire sensor (e.g., including one output terminal), a four-wire sensor (e.g., including two output terminals), or the like. Additional details regarding magnetic sensor 215 are described below with regard to FIG. 3.

ECU 220 may include a device associated with controlling one or more electrical systems and/or electrical subsystems, such as one or more electrical systems and/or one electrical subsystems included in a motor vehicle. For example, ECU 220 may include an electronic/engine control module (ECM), a powergain control module (PCM), a transmission control module (TCM), a brake control module (BCM or EBCM), a central control module (CCM), a central timing module (CTM), a general electronic module (GEM), a body control module (BCM), a suspension control module (SCM), or the like.

In some implementations, ECU 220 may be connected to magnetic sensor 215 such that ECU 220 may receive outputs, associated with the rotation of tooth wheel 205, via one or more transmission interfaces and/or via one or more output terminals. In some implementations, ECU 220 may be capable of calibrating, controlling, adjusting, or the like, the one or more electrical systems and/or electrical subsystems based on the information transmitted by magnetic sensor 215.

In some implementations, one or more items of environment 200 may be included in a magnetic circuit. For example, the magnetic circuit may include magnetic sensor 215; magnetic sensor 215 and tooth wheel 205; magnetic sensor 215, tooth wheel 205 and magnet 210, or the like.

The number and arrangement of apparatuses shown in FIG. 2 is provided as an example. In practice, there may be additional apparatuses, fewer apparatuses, different apparatuses, or differently arranged apparatuses than those shown in FIG. 2. Furthermore, two or more apparatuses shown in FIG. 2 may be implemented within a single apparatus, or a single apparatus shown in FIG. 2 may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
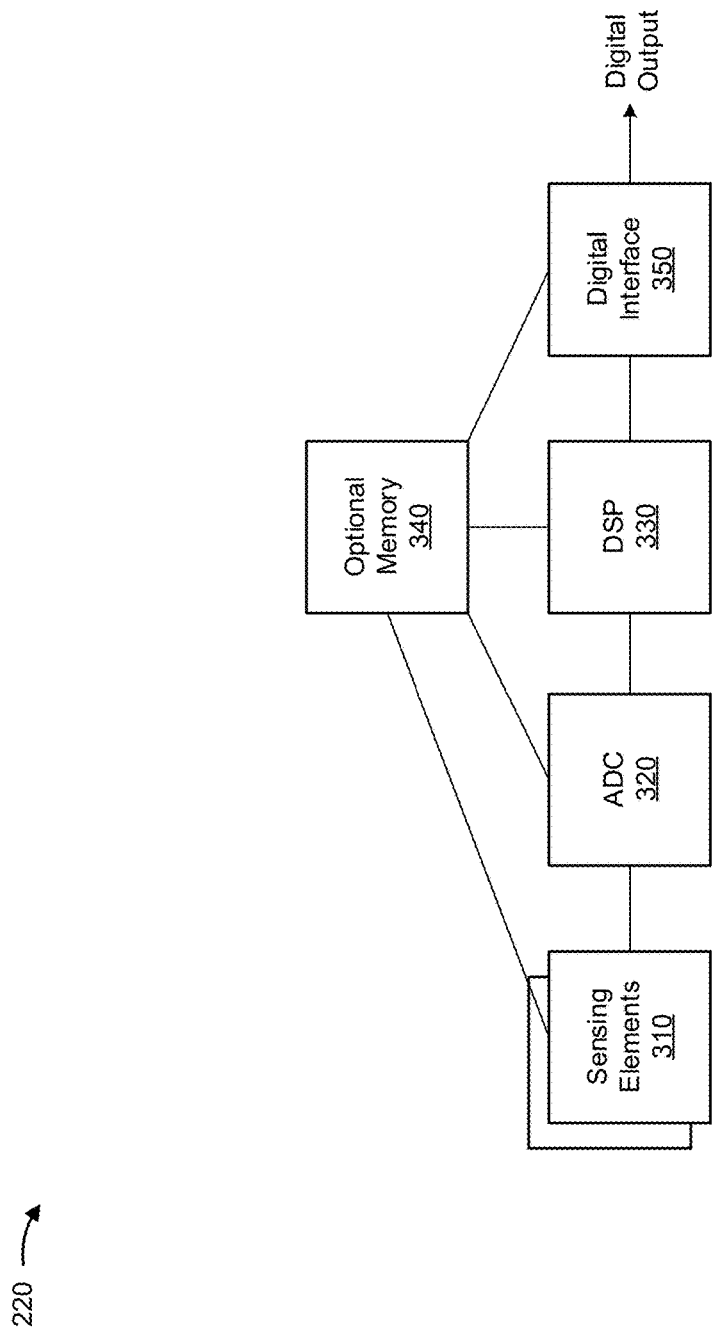
FIG. 3 is a diagram of example components of a magnetic sensor included in the example environment of FIG. 2.

FIG. 3 is a diagram of example components of magnetic sensor 215 included in example environment 200 of FIG. 2. As shown, magnetic sensor 215 may include a group of sensing elements 310, an analog-to-digital convertor (ADC) 320, a digital signal processor (DSP) 330, an optional memory component 340, and a digital interface 350.

Sensing element 310 may include one or more apparatuses for sensing an amplitude of a component of a magnetic field present at magnetic sensor 215 (e.g., the magnetic field generated by magnet 210). For example, sensing element 310 may include a MR sensing element capable of sensing a tangential component of a magnetic field associated with tooth wheel 205. As a particular example, sensing element 310 may be comprised of a magnetoresistive material (e.g., nickel iron (NiFe)), where the electrical resistance of the magnetoresistive material may depend on a strength and/or a direction of the magnetic field present at the magnetoresistive material. Here, sensing element 310 may measure magnetoresistance based on an AMR effect, a GMR effect, a TMR effect, or the like. In some implementations, sensing element 310 may provide an analog signal, corresponding to the external magnetic field, to ADC 320.

ADC 320 may include an analog-to-digital converter that converts an analog signal from the one or more sensing elements 310 to a digital signal. For example, ADC 320 may convert analog signals, received from the one or more sensing elements 310, into digital signals to be processed by DSP 330. ADC 320 may provide the digital signals to DSP 330. In some implementations, magnetic sensor 215 may include one or more ADCs 320.

DSP 330 may include a digital signal processing device or a collection of digital signal processing devices. In some implementations, DSP 330 may receive digital signals from ADC 320 and may process the digital signals to form output signals (e.g., destined for ECU 220 as shown in FIGS. 2A and 2B), such as output signals associated with determining the rotation angle of magnet 210 rotating with a rotatable object.

Optional memory component 340 may include a read only memory (ROM), an EEPROM, a random access memory (RAM), and/or another type of dynamic or static storage device (e.g., a flash memory, a magnetic memory, or an optical memory) that stores information and/or instructions for use by magnetic sensor 215. In some implementations, optional memory component 340 may store information associated with processing performed by DSP 330. Additionally, or alternatively, optional memory component 340 may store configurational values (e.g., a variable switching threshold value) or parameters for sensing elements 310 and/or information for one or more other components of magnetic sensor 215, such as ADC 320 or digital interface 350.

Digital interface 350 may include an interface via which magnetic sensor 215 may receive and/or provide information from and/or to another device, such as ECU 220. For example, digital interface may provide the output determined by DSP 330 to ECU 220 in the form of an output voltage, an output current, or the like. In some implementations, magnetic sensor 215 may include a set of digital interfaces, where one of more digital interfaces, in the set of digital interfaces, may be associated with one or more output terminals of magnetic sensor 215.

The number and arrangement of components shown in FIG. 3 are provided as an example. In practice, magnetic sensor 215 may include additional components, fewer components, different components, or differently arranged components than those shown in FIG. 3. Additionally, or alternatively, a set of components (e.g., one or more components) of magnetic sensor 215 may perform one or more functions described as being performed by another set of components of magnetic sensor 215.

Figure 4:
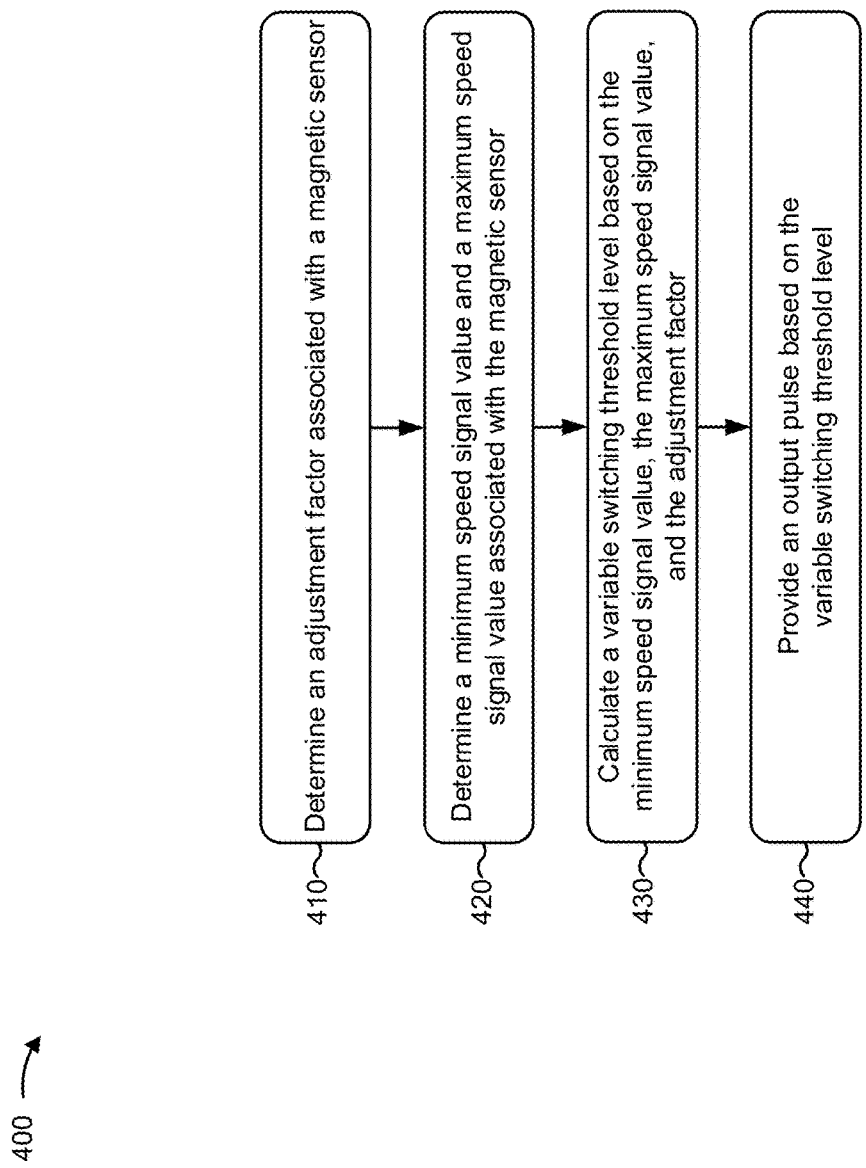
FIG. 4 is a flow chart of an example process for calculating a variable switching threshold level for a magnetic sensor, and providing outputs based on the variable switching threshold level.

FIG. 4 is a flow chart of an example process 400 for calculating a variable switching threshold level for a magnetic sensor, and providing outputs based on the variable switching threshold level.

As further shown in FIG. 4, process 400 may include determining an adjustment factor associated with a magnet sensor (block 410). For example, magnetic sensor 215 may determine an adjustment factor. In some implementations, magnetic sensor 215 may determine an adjustment factor for magnetic sensor 215.

As described above, the adjustment factor may include a value corresponding to a switching threshold for which phase variations in speed signals, resulting from various air gaps associated with magnetic sensor 215, are small (e.g., relative to phase variations associated with other k-factors), minimized (e.g., approximately zero), less than a threshold amount, or the like. For example, the adjustment factor may be a value from 0.0 to 1.0, a percentage from 0% to 100%, or the like. In some implementations, magnetic sensor 215 may determine the level at which the variable switching threshold is to be configured based on the adjustment factor, as described below.

In some implementations, magnetic sensor 215 may determine the adjustment factor based on information stored or accessible by magnetic sensor 215. For example, magnetic sensor 215 may receive (e.g., during production of magnetic sensor 215, from another device, based on user input, etc.) information that identifies the adjustment factor, and may store the information that identifies the adjustment factor, accordingly. In some implementations, the adjustment factor, stored or accessible by magnetic sensor 215, may be determined and/or identified during manufacture, testing, and/or production of magnetic sensor 215. For example, performance of a magnetic circuit (e.g., including magnetic sensor 215) may be tested and/or simulated for a variety of air gap sizes, and the adjustment factor may be identified, as described below.

Figure 5:
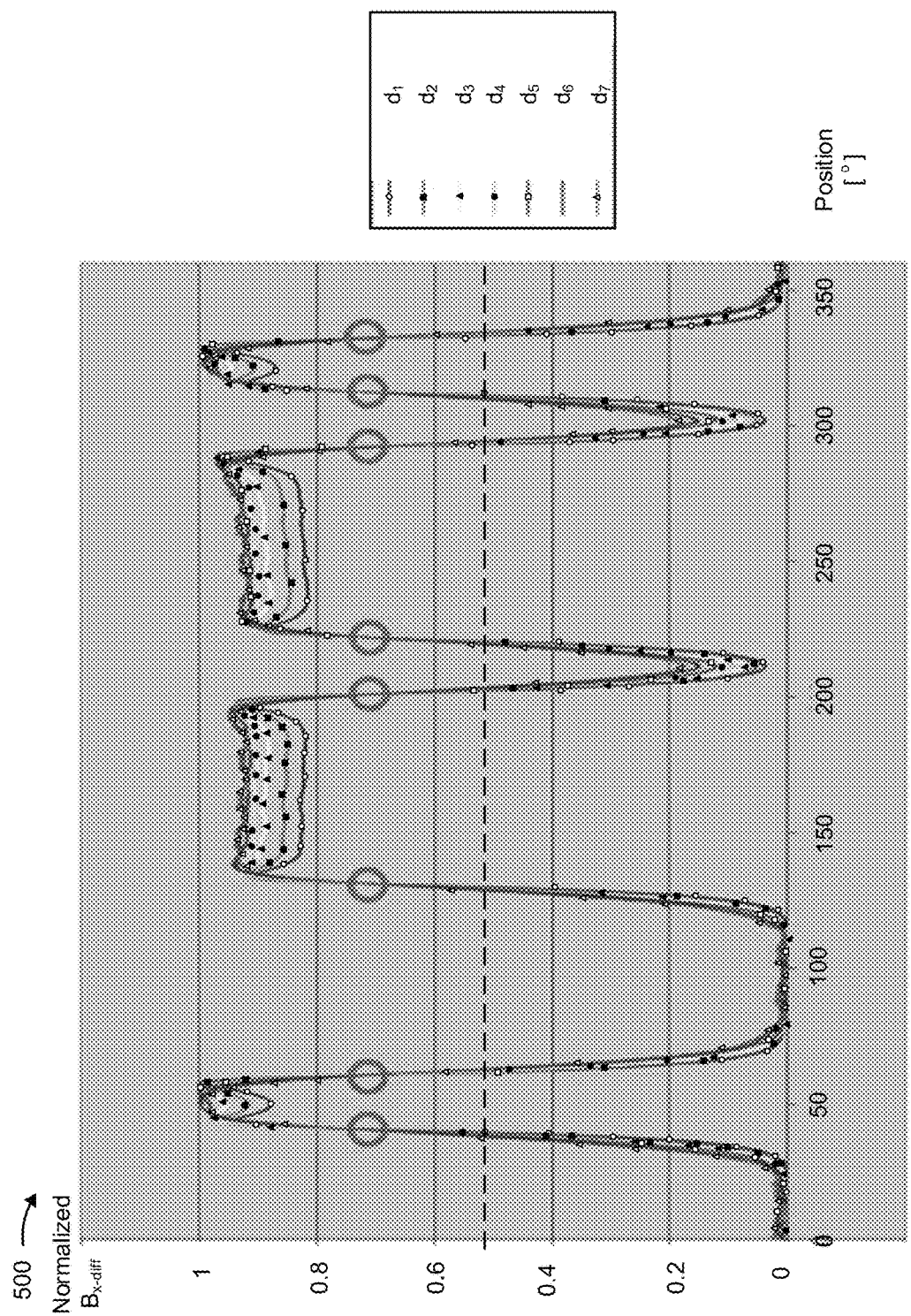
FIG. 5 is a graphical representation of an example of comparing normalized speed signals corresponding to various air gap sizes from which the adjustment factor may be identified.

FIG. 5 is a graphical representation of an example 500 of comparing normalized speed signals corresponding to various air gap sizes from which the adjustment factor may be identified. As shown in FIG. 5, a set of speed signals for various air gaps (e.g., ranging from $d_1$ to $d_7$) may be determined (e.g., via testing or simulation) for a particular magnetic circuit (e.g., including magnetic sensor 215, tooth wheel 205 with a particular wheel geometry, and a particular magnet 210). As shown, for each air gap size, the speed signal corresponding to each air gap size may be normalized such that the speed signal ranges from approximately 0%

(e.g., 0.0), representing a normalized minimum value of the speed signal determined by magnetic sensor 215, to approximately 100% (e.g., 1.0), representing a normalized maximum value of the speed signal determined by magnetic sensor 215.

In the example shown in FIG. 5, assume that the speed signals have been normalized such that the typical static switching thresholds (e.g., half of a difference between the maximum speed signal value and the minimum speed signal value) for various speed signals have a normalized value of 50% (e.g., 0.5). The normalized static switching threshold is identified by the dashed line in FIG. 5. However, as illustrated in FIG. 5, and consistent with the above description, the speed signals have inconsistent (i.e., different) values at the normalized static switching threshold. In other words, if magnetic sensor 215 were to use the static switching threshold (e.g., a speed signal value corresponding to a normalized value of 0.5) as the switching threshold, phase variations would exist between speed signals for the various air gap sizes.

In this example, the adjustment factor may be identified based on the normalized speed signals in order to reduce such phase variations. For example, as illustrated by the circle symbols in FIG. 5, at a normalized speed signal value of approximately 0.7, the speed signals have a relatively consistent value across the various air gaps. In other words, in the example shown in FIG. 5, an adjustment factor of 0.7 may serve to reduce and/or minimize phase variations between the speed signals for the various air gap sizes. In this case, magnetic sensor 215 may be configured with an adjustment factor of 0.7. In some implementations, the adjustment factor may be selected in order to reduce phase variations, as describe in the above example.

Figure 6:
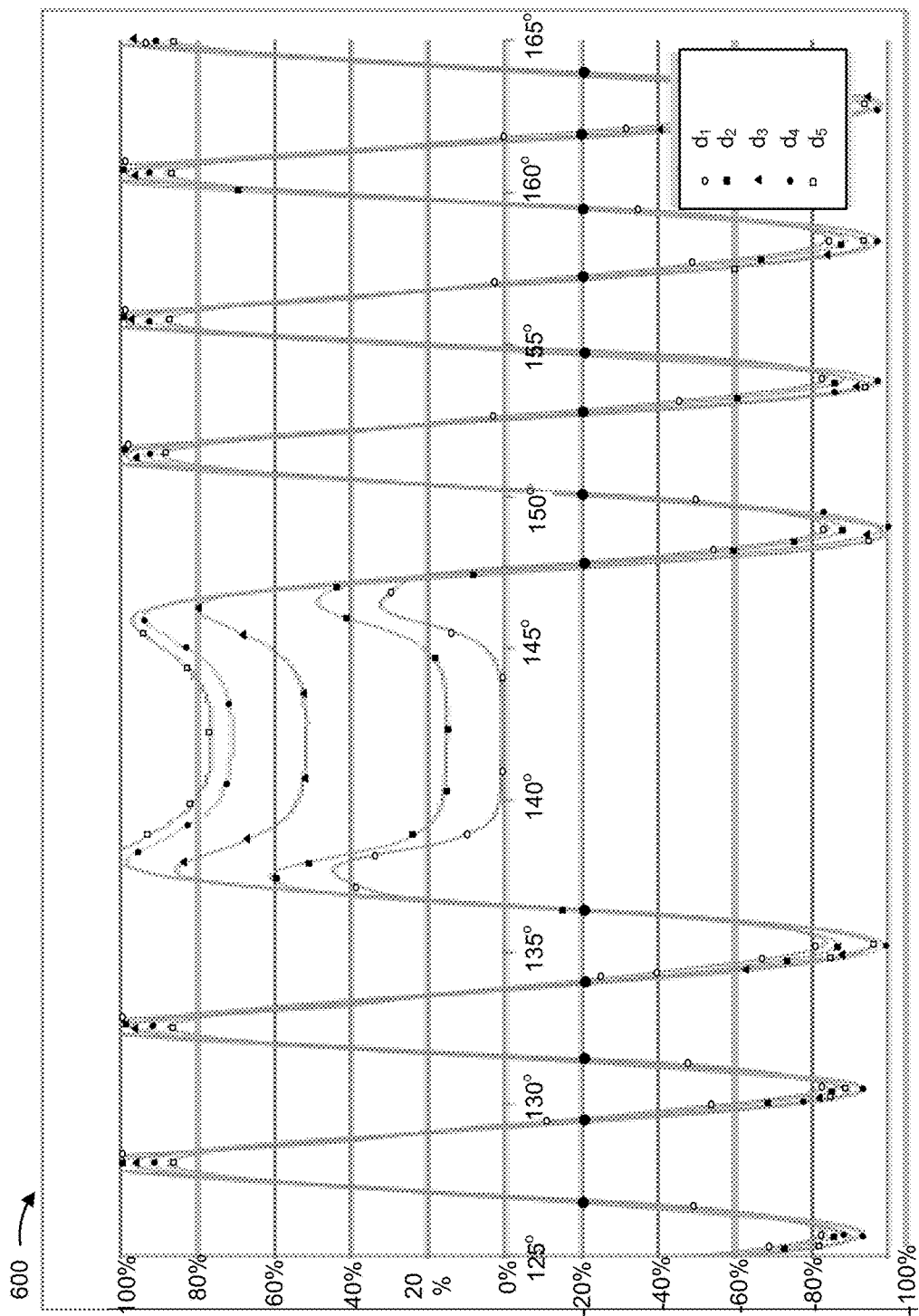
FIG. 6 is a graphical representation of an example of comparisons of normalized speed signals corresponding to various air gap sizes from which the adjustment factor may be identified.

Additionally, or alternatively, the adjustment factor may be selected based on another criteria, such as improving robustness against magnetic sensor 215 providing unwanted and/or erroneous outputs. FIG. 6 is a graphical representation of an example 600 of comparisons of normalized speed signals corresponding to various air gap sizes from which the adjustment factor may be identified. As shown in FIG. 6, a set of speed signals for various air gaps (e.g., ranging from $d_1$ to $d_5$) may be determined for a particular magnetic circuit (e.g., including magnetic sensor 215, tooth wheel 205 with a particular wheel geometry, and a particular magnet 210). As shown, for each air gap size, the speed signal corresponding to each air gap size may be normalized such that the speed signal ranges from approximately −100% (e.g., 0.0), representing a normalized minimum value of the speed signal determined by magnetic sensor 215, to approximately 100% (e.g., 1.0), representing a normalized maximum value of the speed signal determined by magnetic sensor 215.

In the example shown in FIG. 6, assume that the speed signals have been normalized such that the typical static switching threshold of the various speed signals have a normalized value of 0% (e.g., half of a difference between the normalized minimum speed signal and the normalized maximum speed signal). Notably, in this example, use of the typical static switching threshold (e.g., at 0%, corresponding to 0.5) may not result in significant phase variations for the various air gap sizes. However, use of the zero crossings may result in unwanted switching (e.g., between approximately 140° and 145° during a rotation) when the air gap, associated with magnetic sensor 215, is of size $d_1$. The region associated with the unwanted switching may be, for example, a reference zone of tooth wheel 205.

As shown in FIG. 6, for a normalized speed signal value of approximately −20% (e.g., 0.4), the speed signals have a relatively consistent value across the various air gaps, and the likelihood of unwanted switching is significantly reduced. In other words, in the example shown in FIG. 6, an adjustment factor of 0.4 may serve to reduce and/or minimize unwanted switching while keeping phase variations between the speed signals for the various air gap sizes relatively insignificant. In this case, magnetic sensor 215 may be configured with an adjustment factor of 0.4.

Returning to FIG. 4, process 400 may further include determining a minimum speed signal value and a maximum speed signal value associated with the magnet sensor (block 420). For example, magnetic sensor 215 may determine a minimum speed signal value and a maximum speed signal value associated with magnetic sensor 215. In some implementations, magnetic sensor 215 may determine the minimum speed signal value and the maximum speed signal value during one or more rotations of tooth wheel 205.

The minimum speed signal value (e.g., $B_{x\text{-}min}$) may include a minimum strength of the speed signal associated with the x-component of the magnetic field, determined by magnetic sensor 215, during a rotation of tooth wheel 205. Similarly, the maximum speed signal value (e.g., $B_{x\text{-}max}$) may include a maximum strength of the speed signal associated with the x-component of the magnetic field, determined by magnetic sensor 215, during the rotation of tooth wheel 205. In some implementations, magnetic sensor 215 may calculate a level at which a variable switching threshold is to be configured (herein referred to as a variable switching threshold level) based on the minimum speed signal value and the maximum speed signal value, as described below.

As further shown in FIG. 4, process 400 may include calculating a variable switching threshold level based on the minimum speed signal value, the maximum speed signal value, and the adjustment factor (block 430). For example, magnetic sensor 215 may calculate the variable switching threshold level based on the minimum speed signal value, the maximum speed signal value, and the adjustment factor. In some implementations, magnetic sensor 215 may calculate the variable switching threshold level after magnetic sensor 215 determines the adjustment factor. Additionally, or alternatively, magnetic sensor 215 may calculate the variable switching threshold level when magnetic sensor 215 determines the minimum speed signal value and the maximum speed signal value.

In some implementations, magnetic sensor 215 may determine the variable switching threshold level based on the adjustment factor (e.g., k), the minimum speed signal value (e.g., $B_{x\text{-}min}$), and the maximum speed signal value (e.g., $B_{x\text{-}max}$). For example, magnetic sensor 215 may determine the variable switching threshold level using the following formula:

$$B_{cal} = B_{x\text{-}min} + (B_{x\text{-}max} - B_{x\text{-}min}) \times k$$

where $B_{cal}$ represents the variable switching threshold level and k represents the adjustment factor. As such, the variable switching threshold level (e.g., $B_{cal}$) may include a speed signal value (e.g., with units in mT) that is between $B_{x\text{-}min}$ and $B_{x\text{-}max}$. In some implementations, the variable switching threshold level may be a positive value, a negative value, or a value equal to zero.

In some implementations, magnetic sensor 215 may calculate the variable switching threshold in another manner and/or based on other information. For example, in some implementations, magnetic sensor 215 may calculate the variable switching threshold level based on one or more other items of information associated with magnetic sensor 215 and/or the magnetic circuit that includes magnetic sensor 215, such as an average minimum of the speed signal (e.g., associated with multiple rotations of tooth wheel 205), an average maximum of the speed signal (e.g., associated with multiple rotations of tooth wheel 205), a length of one or more teeth and/or notches of tooth wheel 205, a tooth-to-notch ratio associated with tooth wheel 205, or the like.

As described above, the variable switching threshold level may be used to configure a variable switching threshold of magnetic sensor 215. As described above, the variable switching threshold may include a configurable switching threshold (e.g., a configurable magnetic field strength) at which magnetic sensor 215 may be configured to provide outputs (rather than providing outputs based on only the static switching threshold).

In some implementations, magnetic sensor 215 may calculate the variable switching threshold level, and may configure the variable switching threshold of magnetic sensor 215 in order to cause magnetic sensor 215 to provide outputs based on the variable switching threshold level, as described below.

In some implementations, magnetic sensor 215 may periodically calculate the variable switching threshold level (e.g., in order to determine an updated variable switching threshold level). For example, magnetic sensor 215 may be configured to periodically (e.g., once per 100 milliseconds (ms), once per second, or once per minute) determine an updated adjustment factor, an updated $B_{x-max}$, and/or an updated $B_{x-min}$, and determine an updated variable switching threshold level, accordingly. In this way, the variable switching threshold level may be updated based on changes in the speed signal, in order to ensure that the adjustment factor is accurately applied to the speed signal. In some implementations, magnetic sensor 215 may update the configuration of the variable switching threshold based on the update by, for example, replacing a previous variable switching threshold level with the updated variable switching threshold level, replacing the previous variable switching threshold level with a weighted average of one or more previous variable switching threshold levels and the updated variable switching threshold level, or the like.

Additionally, or alternatively, magnetic sensor 215 may calculate the variable switching threshold level based on an operating mode of magnetic sensor 215. For example, magnetic sensor 215 may be configured to calculate the variable switching threshold level a first number of times or at a first frequency while magnetic sensor 215 is in a first operating mode, and may be configured to calculate the variable switching threshold a second number of times or at a second frequency while magnetic sensor 215 is in a second operating mode.

Figure 7:
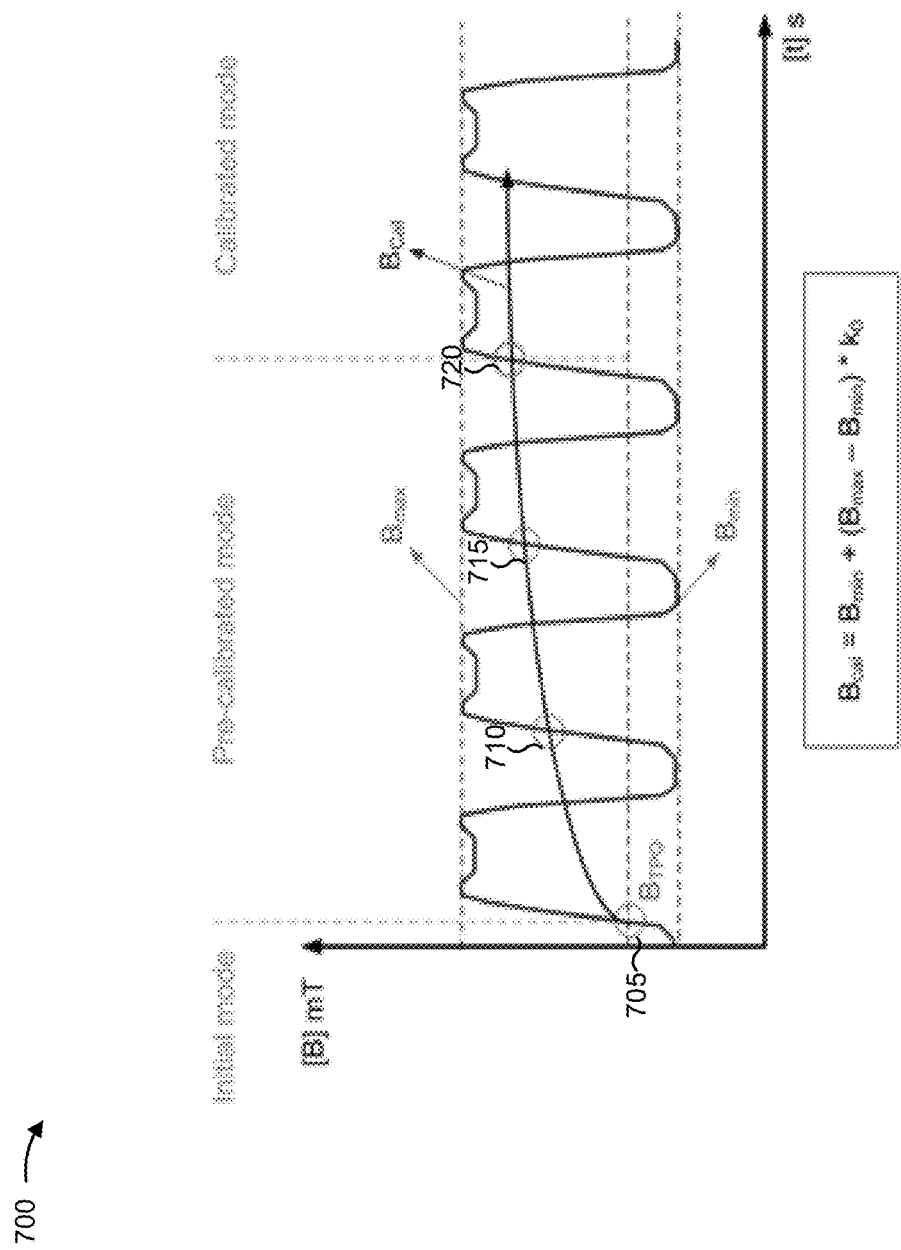
FIG. 7 is a graphical representation of an example associated with a magnetic sensor calculating a variable switching threshold level based on an operating mode of the magnetic sensor.

FIG. 7 is a graphical representation of an example 700 associated with magnetic sensor 215 calculating the variable switching threshold level based on an operating mode of magnetic sensor 215. As shown in FIG. 7, magnetic sensor 215 may not calculate the variable switching threshold level while magnetic sensor 215 is in a first operating mode (e.g., an initial operating mode). As further shown, while magnetic sensor 215 is in a second operating mode (e.g., a pre-calibrated operating mode entered after the initial mode), magnetic sensor 215 may periodically (e.g., every 100 milliseconds (ms)) calculate the variable switching threshold. As shown by reference numbers 705, 710, and 715, magnetic sensor 215 may calculate the variable switching threshold level three times in association with the second operating mode. As further shown, while magnetic sensor 215 is in a third operating mode (e.g., a calibrated operating mode entered after the pre-calibrated mode), magnetic sensor 215 may calculate the variable switching threshold. As shown by reference number 720, magnetic sensor 215 may calculate the variable switching threshold a single time when magnetic sensor 215 enters the third operating mode. In some implementations, magnetic sensor 215 may periodically (e.g., every 1 second) calculate the variable switching threshold while magnetic sensor 215 is in the third operating mode.

Returning to FIG. 4, process 400 may further include providing an output based on the variable switching threshold level (block 440). For example, magnetic sensor 215 may provide an output based on the variable switching threshold level. In some implementations, magnetic sensor 215 may provide the output after magnetic sensor 215 calculates the variable switching threshold level and configures the variable switching threshold of magnetic sensor 215, accordingly.

In some implementations, as described above, magnetic sensor 215 may provide an output based on whether a speed signal, determined by magnetic sensor 215, satisfies the variable switching threshold. For example, magnetic sensor 215 may provide a first output (e.g., an output signal with a first voltage level, such as 1 volt) while the speed signal satisfies the variable switching threshold (e.g., while $B_{x-diff}$ is greater than $B_{cal}$). Similarly, magnetic sensor 215 may provide a second output (e.g., an output signal with a second voltage level, such as 0 volts) while the speed signal does not satisfy the variable switching threshold (e.g., while $B_{x-diff}$ is less than or equal to $B_{cal}$). In this way, magnetic sensor 215 may provide outputs based on comparing the speed signal to the variable switching threshold, rather than providing outputs based on a static switching threshold that may result in phase variations of the speed signal.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 8:
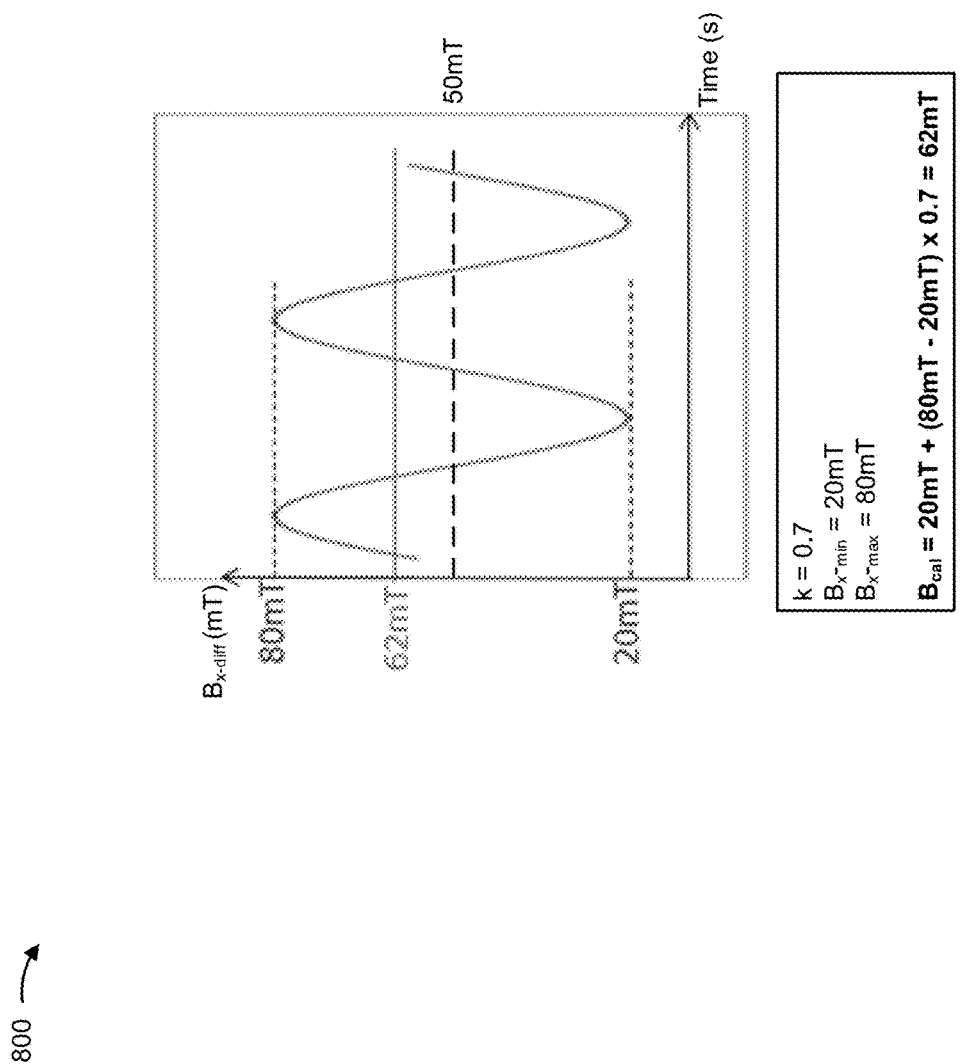
FIG. 8 is a diagram of an additional example implementation related to the example process shown in FIG. 4.

FIG. 8 is a diagram of an example implementation 800 related to example process 400 shown in FIG. 4. For the purposes of example implementation 800, assume that magnetic sensor 215 is configured with an adjustment factor of 0.7 (e.g., k=0.7). Further, assume that, during a rotation of tooth wheel 205, magnetic sensor 215 determines a minimum speed signal value of 20 mT (e.g., $B_{x-min}$=20 mT), and a maximum speed signal value of 80 mT (e.g., $B_{x-max}$=80 mT).

As shown in FIG. 8, magnetic sensor 215 may calculate a variable switching threshold level of 62 mT (e.g., Bcal=20 mT+(80 mT−20 mT)×0.7=20 mT+42 mT=62 mT).

Here, magnetic sensor 215 may configure a variable switching threshold of magnetic sensor 215 with the calculated variable switching threshold level, and may provide outputs, accordingly. As shown, the variable switching threshold may differ from the typical static switching threshold (i.e., half of the difference between $B_{x-min}$ and $B_{x-max}$, or 50 mT).

As indicated above, FIG. 8 is provided merely as an example. Other examples are possible and may differ from what was described with regard to FIG. 8.

Implementations described herein may describe a magnetic sensor capable of determining and configuring a variable switching threshold for providing outputs associated with a magnetic field present at the magnetic sensor. The use of the variable switching threshold reduces an effect (e.g., phase variations) on a speed signal caused by variations in an air gap associated with the magnetic sensor, leading to improved performance of the magnetic sensor (e.g., as compared to using a static switching threshold).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic circuit, comprising:
   a magnetic sensor to:
      determine an adjustment factor associated with calculating a variable switching threshold,
         the variable switching threshold being a configurable switching threshold based on which the magnetic sensor provides outputs associated with a speed signal corresponding to a rotation of a tooth wheel, and
         the adjustment factor including a value determined based on various air gaps between the magnetic sensor and the tooth wheel;
      calculate the variable switching threshold based on the adjustment factor;
      periodically determine an updated adjustment factor;
      calculate an updated variable switching threshold in accordance with periodically determining the updated adjustment factor; and
      provide an output, associated with the speed signal, based on the updated variable switching threshold.

2. The magnetic circuit of claim 1, where the magnetic sensor is further to:
   determine a minimum speed signal value and a maximum speed signal value during the rotation of the tooth wheel; and
   where the magnetic sensor, when calculating the variable switching threshold based on the adjustment factor, is to:
      calculate the variable switching threshold based on the minimum speed signal value, the maximum speed signal value, and the adjustment factor.

3. The magnetic circuit of claim 2, where the magnetic sensor, when calculating the variable switching threshold, is to:
   multiply a difference between the maximum speed signal value and the minimum speed signal value by the adjustment factor to determine a result; and
   add the minimum speed signal value to the result to determine a value of the variable switching threshold.

4. The magnetic circuit of claim 2, where the minimum speed signal value is a first minimum speed signal value, the maximum speed signal value is a first maximum speed signal value, and the variable switching threshold is a first variable switching threshold,
   where the magnetic sensor is further to:
      determine a second minimum speed signal value and a second maximum speed signal value during the rotation of the tooth wheel;
      calculate a second variable switching threshold based on the second minimum speed signal value, the second maximum speed signal value, and the adjustment factor; and
      configure the magnetic sensor with the second variable switching threshold.

5. The magnetic circuit of claim 4, where the magnetic sensor, when configuring the magnetic sensor with the second variable switching threshold, is to:
   overwrite the first variable switching threshold with the second variable switching threshold.

6. The magnetic circuit of claim 1, where the magnetic sensor, when providing the output, is to:
   provide a first output while the speed signal satisfies the updated variable switching threshold; and
   provide a second output while the speed signal does not satisfy the updated variable switching threshold,
   the first output being different from the second output.

7. The magnetic circuit of claim 1, where the magnetic sensor is a magnetoresistive sensor, a Hall sensor, or a variable reluctance sensor.

8. The magnetic circuit of claim 1, where the magnetic sensor is further to:
   store information that identifies the adjustment factor; and
   where the magnetic sensor, when determining the adjustment factor, is to:
      determine the adjustment factor based on the stored information.

9. A sensor, comprising:
   one or more sensing elements; and
   a processor to:
      determine an adjustment factor associated with a configurable switching threshold,
         the configurable switching threshold being a threshold associated with providing output signals associated with a signal corresponding to a component detected by the one or more sensing elements, and
         the adjustment factor including a value determined based on one or more air gaps between the sensor and the component;
      determine a minimum signal value, associated with the signal, and a maximum signal value associated with the signal;
      calculate the configurable switching threshold based on the minimum signal value, the maximum signal value, and the adjustment factor; and
      periodically determine an updated adjustment factor;
      calculate an updated configurable switching threshold in accordance with periodically determining the updated adjustment factor; and provide an output signal, associated with the signal, based on the updated configurable switching threshold.

10. The sensor of claim 9, where the processor, when calculating the configurable switching threshold, is to:
multiply a difference between the maximum signal value and the minimum signal value by the adjustment factor to determine a result; and
combine the minimum signal value and the result to determine a value of the configurable switching threshold.

11. The sensor of claim 9, where the adjustment factor includes:
a constant value;
a variable value;
stored in a memory location associated with the sensor; or
dependent on an amplitude of the signal.

12. The sensor of claim 9, where the updated configurable switching threshold is a first updated configurable switching threshold; and
where the processor is further to:
determine an updated minimum signal value and an updated maximum signal value;
calculate a second updated configurable switching threshold based on the updated minimum signal value, the updated maximum signal value, and the adjustment factor; and
configure the sensor based on the second updated configurable switching threshold.

13. The sensor of claim 12, where the processor is further to:
determine an average switching threshold based on the configurable switching threshold and the first updated configurable switching threshold; and
where the processor, when calculating the second updated configurable switching threshold, is to:
calculate the second updated configurable switching threshold based on the average switching threshold.

14. The sensor of claim 9, where the signal is a speed signal associated with a rotating tooth wheel.

15. A method, comprising:
identifying, by a magnetic sensor, an adjustment factor associated with determining a variable switching threshold,
the variable switching threshold being a configurable switching threshold associated with providing outputs based on a speed signal corresponding to a magnetic field sensed by the magnetic sensor, and
the adjustment factor including a value determined based on one or more air gaps between the magnetic sensor and a tooth wheel;
calculating, by the magnetic sensor, the variable switching threshold based on the adjustment factor;
periodically determining, by the magnetic sensor, an updated adjustment factor;
calculating, by the magnetic sensor, an updated variable switching threshold based on the updated adjustment factor; and
providing, by the magnetic sensor, a set of outputs, associated with the speed signal, based on the updated variable switching threshold.

16. The method of claim 15, further comprising:
determining a minimum speed signal value during a rotation of the tooth wheel;
determining a maximum speed signal value during the rotation of the tooth wheel; and
where calculating the variable switching threshold based on the adjustment factor comprises:
calculating the variable switching threshold based on the minimum speed signal value, the maximum speed signal value, and the adjustment factor.

17. The method of claim 16, where calculating the variable switching threshold comprises:
multiplying a difference between the maximum speed signal value and the minimum speed signal value by the adjustment factor to determine a result; and
adding the minimum speed signal value to the result to determine the variable switching threshold.

18. The method of claim 16, where the minimum speed signal value is a first minimum speed signal value, the maximum speed signal value is a first maximum speed signal value, and the variable switching threshold is a first switching threshold,
where the method further comprises:
determining a second minimum speed signal value and a second maximum speed signal value during the rotation of the tooth wheel;
determining a second switching threshold based on the second minimum speed signal value, the second maximum speed signal value, and the adjustment factor; and
configuring the magnetic sensor with the second switching threshold.

19. The method of claim 15, where providing the set of outputs comprises:
providing a first output when the speed signal satisfies the updated variable switching threshold; and
providing a second output when the speed signal does not satisfy the updated variable switching threshold,
the first output being different from the second output.

20. The method of claim 15, where the magnetic sensor includes a set of sensing elements configured to sense a component of the magnetic field in a direction that is generally parallel to a direction of rotation of the tooth wheel.

* * * * *